Nov. 11, 1958     J. C. RHODES ET AL     2,859,620
AUTOMATIC CONSTANT RATE SAMPLE FEEDER
Filed Dec. 29, 1955

INVENTORS:
Joseph C. Rhodes
John P. Segers
Anthony V. Lacko

BY Everett A. Johnson
ATTORNEY

2,859,620

AUTOMATIC CONSTANT RATE SAMPLE FEEDER

Joseph C. Rhodes, Park Forest, and John P. Segers, Crete, Ill., and Anthony V. Lacko, Gary, Ind., assignors to Standard Oil Company, Chicago, Ill., a corporation of Indiana Application December 29, 1955, Serial No. 556,177

6 Claims. (Cl. 73—421)

This invention relates to devices for metering a liquid sample into an instrument for making a measurement on the liquid sample. It has utility in any analytical technique wherein measured test samples are introduced into the instrument.

A primary object of our invention is to provide an automatic sample feeder. A further object is to provide such a feeder for introducing a sample to a batch type instrument at a constant rate. An additional object is to provide a sample feeder which is self-clearing so as to avoid contamination of a subsequent sample. Still another object of the invention is to provide an apparatus which will measure and automatically deliver a precise sample at a constant rate from a bulk sample. Further objects include the provision of such an apparatus which is rugged, which is foolproof in its operation, and which is adapted for use by personnel without extensive technical or specialized training. Another object is to provide an apparatus to feed samples to continuous instruments wherein the instrument measurement can be interrupted periodically without affecting the instrument's performance. These and other objects of the invention will become apparent as our description thereof proceeds.

Briefly, we attain the objects of our invention by providing an automatic sample feeder which comprises a sample chamber, float means for automatically sealing the sample inlet port to the chamber after the addition of the desired volume of sample, the sample being then displaced from the chamber by a constant stream of air. A capillary in the sample discharge line controls the flow rate. Until the full volume of sample has been delivered, the displacing air maintains the float in the chamber-sealing position whereas upon delivery of the total sample the pressure is relieved and the float falls. A pressure switch on the air supply line controls the on-off operation of the measuring instrument.

Further details and advantages of our meter will be described by reference to a preferred embodiment thereof which is illustrated in the drawing and wherein.

Figure 2:
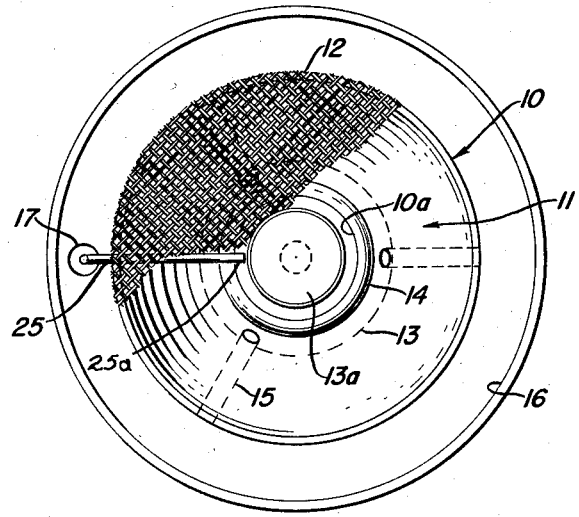
Figure 2 is a plan view along the line 2—2 in Figure 1.
Figure 1:
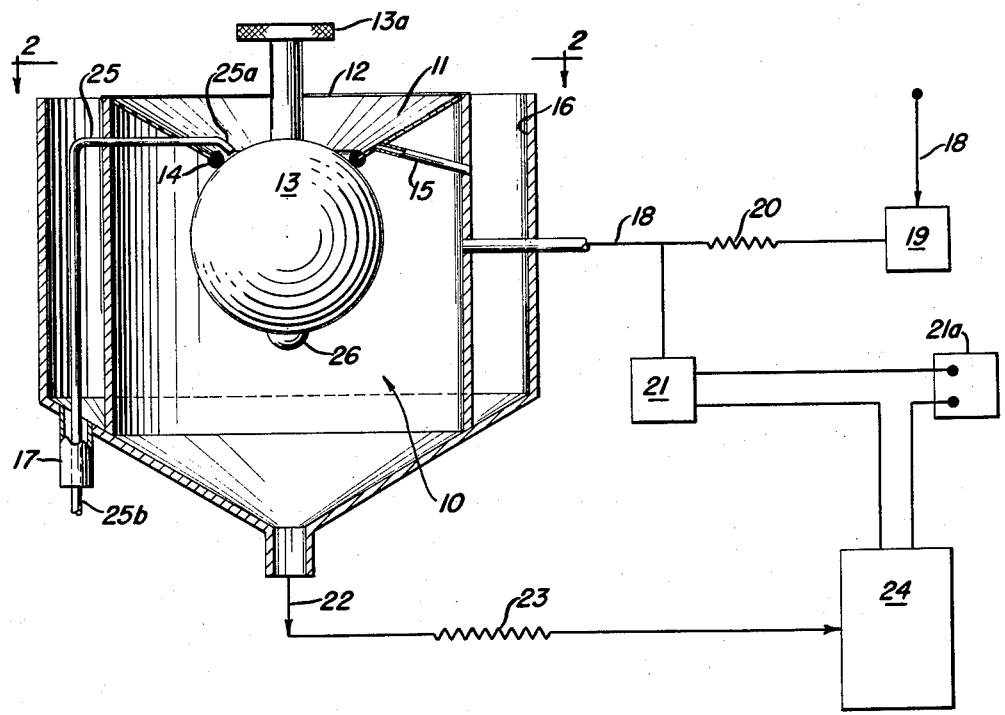
Figure 1 is a schematic elevation, partly in section, of our assembly.

Referring to the drawing, the liquid sample to be tested is poured into the chamber 10 through the funnel 11 provided with a screen 12. As the level of the liquid rises in the chamber 10, the float 13, having extension 13a rises until it seats itself across the inlet port 10a on the resilient seal 14 which is made of some soft material such as neoprene. The excess liquid about the port 10a above the float 13 drains through the tubes 15 from funnel 11 into the drain trough 16 surrounding the chamber 10 and through an overflow line 17 into a sump (not shown).

Attached to the chamber 10 is an air supply line 18 which allows air to bleed into the chamber 10 from a pressure regulator 19 through a small air capillary 20. A pressure switch 21 is attached to this line 18 between the capillary 20 and the chamber 10. At the bottom of the chamber 10, the sample feed line 22 is connected and in this line we provide a sample capillary 23 to regulate the flow rate of the sample from the chamber 10 into the instrument 24. The screen 12 prevents foreign particles from entering the chamber 10 which could plug the sample capillary 23 or prevent the float 13 from seating firmly on seal 14.

When the float 13 has seated itself on the seal 14, across the port 10a, the air flowing through the air capillary 20 into the chamber 10 begins to build up a pressure in the chamber 10 which holds the float 13 firmly on the seal 14 and displaces the sample from the chamber 10 through feed line 22 and through the sample capillary 23 at a regulated rate to the instrument 24. When the pressure in the chamber 10 reaches a selected level, the pressure switch 21 in the air line 18 is actuated and power supply 21a to the instrument 24 is automatically turned on.

As the sample flows from the chamber 10 through the feed capillary 23, the sample level in the chamber 10 lowers. However, the float 13 remains firmly seated on seal 14 by the pressure due to the displacement air within the chamber 10. When all the sample has been discharged from the chamber 10, the pressure in the chamber 10 is relieved since the diameter of the sample capillary 23 is much larger than the diameter of the air capillary 20. Thus, during a run the pressure drop across the air capillary 20 is very small and the pressure drop across the sample capillary 23 is quite high. At the end of a run, the situation reverses. The pressure drop across the air capillary 20 increases substantially due to the increased air flow rate when the oil is exhausted and air beings to flow through the sample capillary 23. When the float 13 drops, the pressure drop across the sample capillary 23 is practically zero and across the air capillary 20 it is almost 10 p. s. i.

The pressure having been reduced in chamber 10, the float 13 drops thereby lowering the pressure in the entire system and the pressure switch 21 is again actuated to turn off the power supply 21a to the instrument 24.

In this sequential operation, the sample feed line 22 has been flushed clean by the displacing air and contamination of a subsequent sample is held to a minimum. As soon as the float 13 drops away from the seal 14 the sample feeder is ready to receive another sample for delivery to the instrument 24.

We have found that contamination of the samples can be further minimized by educting residual excess sample that may be trapped within the funnel 11 by the exposed top of float 13 when it is in its sealing position. This may be accomplished by providing capillary eductor tube 25 which has its inlet end 25a disposed at the base of the funnel 11 and its outlet end in overflow line 17.

The inlet end 25a being submerged within the trapped liquid, the sample liquid travels within the tube 25 by capillary attraction until it reaches a depending portion of the tube 25 whereupon it flows by gravity through the balance of the tube to its discharge end 25b. This initiates a syphon flow of the trapped liquid from within the funnel 11 into the overflow line 27.

In one embodiment of our invention which has proven very satisfactory in operation, the air supply line 18 is a ⅛ inch tubing and capillary 20 has a length of 1.5 inches and an I. D. of about 0.007 inch. The sample line 22 comprised ⅛ inch tubing. The I. D. of the sample capillary 23 on line 22 is 0.031 inch with a length of about 6.0 inches. The pressure regulator 19 was set at 10 p. s. i. The float chamber 10 has a fluid volume of about 150 cc. and when filled with heater oil at room temperature is discharged at a rate of about 33 cc./min. The flow rate of the sample can be adjusted, however, by changing the setting of the pressure regulator 19 or by employing a sample capillary 23 of different dimensions.

The I. D. of the seal 14 on port 10a is about 1 inch with a float 13 comprising a sphere of 1.75 inches in diameter.

The float 13 is provided with a ballast 26 so that it is about ⅔ submerged in the sample to be tested. This results in seating the float 13 more firmly on seal 14 and prevents the seating of the float 13 before the chamber 10 is completely filled with the liquid test sample. Plunger 13a may also be used to depress the float 13 to assure displacement of all air before discharging the sample.

From the above description it will be apparent that we have provided an apparatus for attaining the objects of our invention. A preferred embodiment of the invention has been set forth in some detail but it should be understood that this is by way of illustration only and that modifications can be made in the apparatus and in the mode of using the apparatus without departing from the spirit and scope of the described invention.

What we claim is:

1. A metering device for delivering a fixed quantity of liquid at a constant flow rate which comprises in combination a sample chamber, a top wall in said chamber adapted to hold a liquid thereabove, said top wall having sloping surfaces defining a funnel and having a port formed therein, a resilient seal around said port, a drain trough disposed about said chamber adjacent to said top wall adapted to collect excess liquid from said sloping surfaces, a screen across said funnel, a ball float adapted to rise in said chamber and close said port when in contact with said resilient seal, ballast means on said ball float, capillary-syphon eductor means adapted to withdraw trapped liquid from adjacent said port to avoid contamination of subsequent sample, a sample discharge line in communication with said chamber requiring a pre-selected pressure to cause flow therethrough, and displacement fluid conduit means discharging into said chamber to displace liquid therefrom through said sample discharge line and to maintain said ball float seated on said seal to close said port.

2. The apparatus of claim 1 which includes an overflow line from said drain trough and wherein said eductor means discharges into said overflow line.

3. The apparatus of claim 1 which includes a pressure-actuated switch on said displacement fluid conduit means.

4. The apparatus of claim 1 wherein the flow through the sample displacement fluid conduit means is controlled by a first capillary means, and the flow through the sample discharge line is controlled by a second capillary means.

5. A device for metering a sample into an instrument at a constant rate which comprises in combination a sample chamber, a wide mouthed inlet to said sample chamber, a seal about said inlet, a float adapted to close said inlet by contacting said seal, a sample feed line comprising an outlet from said chamber, a flow restricting capillary in said sample feed line, conduit means for introducing displacement fluid into said chamber, a flow restricting capillary in said conduit means, and an overflow means surrounding said inlet for discharging excess sample from the system.

6. An apparatus for metering a liquid sample at a constant rate in a batch type operation which comprises in combination a measuring chamber, funnel shaped means forming a top wall of said chamber and having a port for admitting liquid sample to said chamber, a drain trough arranged to draw off excess sample, an overflow line from said drain trough, float seal means for closing said port, air supply conduit means including a flow restricting capillary and a pressure regulator for admitting sample-displacing gasiform fluid to said chamber, sample feed line means connected to said chamber and including flow restricting capillary means, whereby introduction of displacing fluid discharges the liquid sample from said chamber and maintains the float seal means closed until the gasiform fluid stream has reached the flow restricting capillary in said sample feed line means, and capillary-syphon eductor tube means for transferring excess sample from said funnel shaped means into said overflow line.

References Cited in the file of this patent

UNITED STATES PATENTS

| 1,785,097 | Raymond | Dec. 16, 1930 |
| 2,311,602 | Thomas | Feb. 16, 1943 |
| 2,396,527 | Osborne | Mar. 12, 1946 |